May 18, 1954  B. M. PETERS  2,678,595
CULTIVATOR
Filed Feb. 2, 1951  4 Sheets-Sheet 4
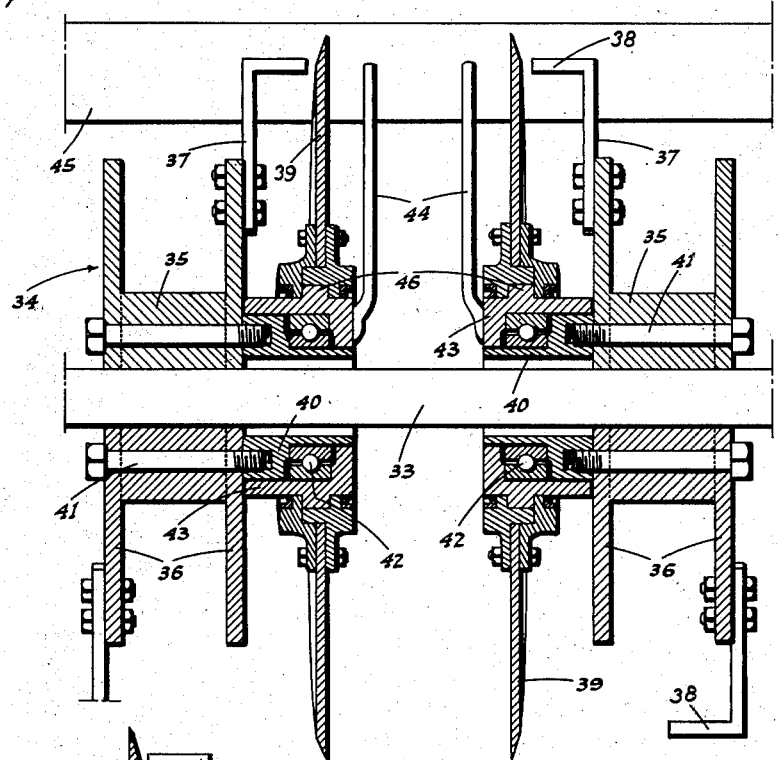
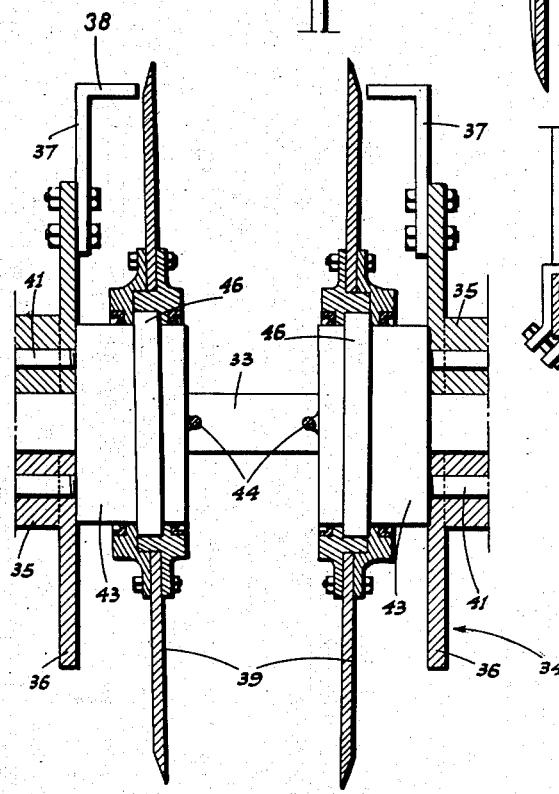
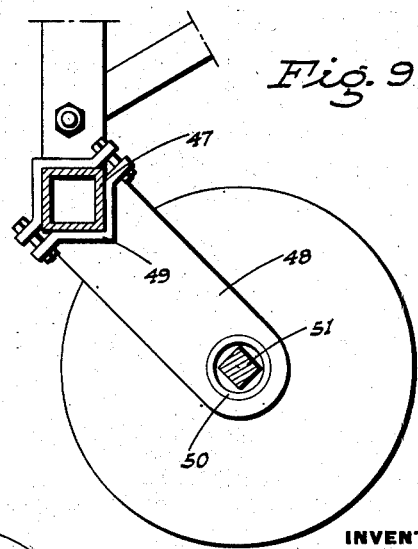
INVENTOR
Byron M. Peters
BY
ATTORNEYS Patented May 18, 1954

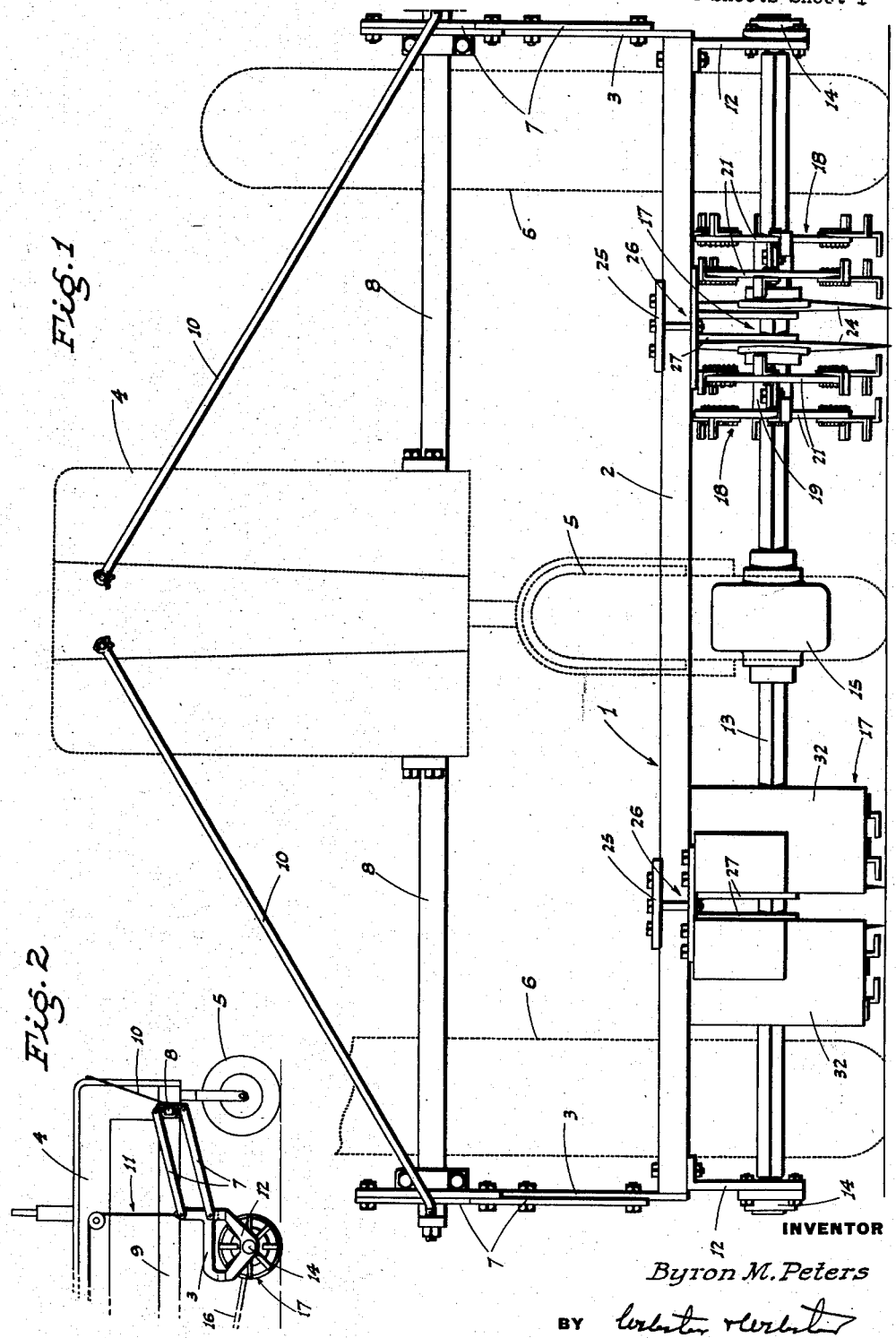

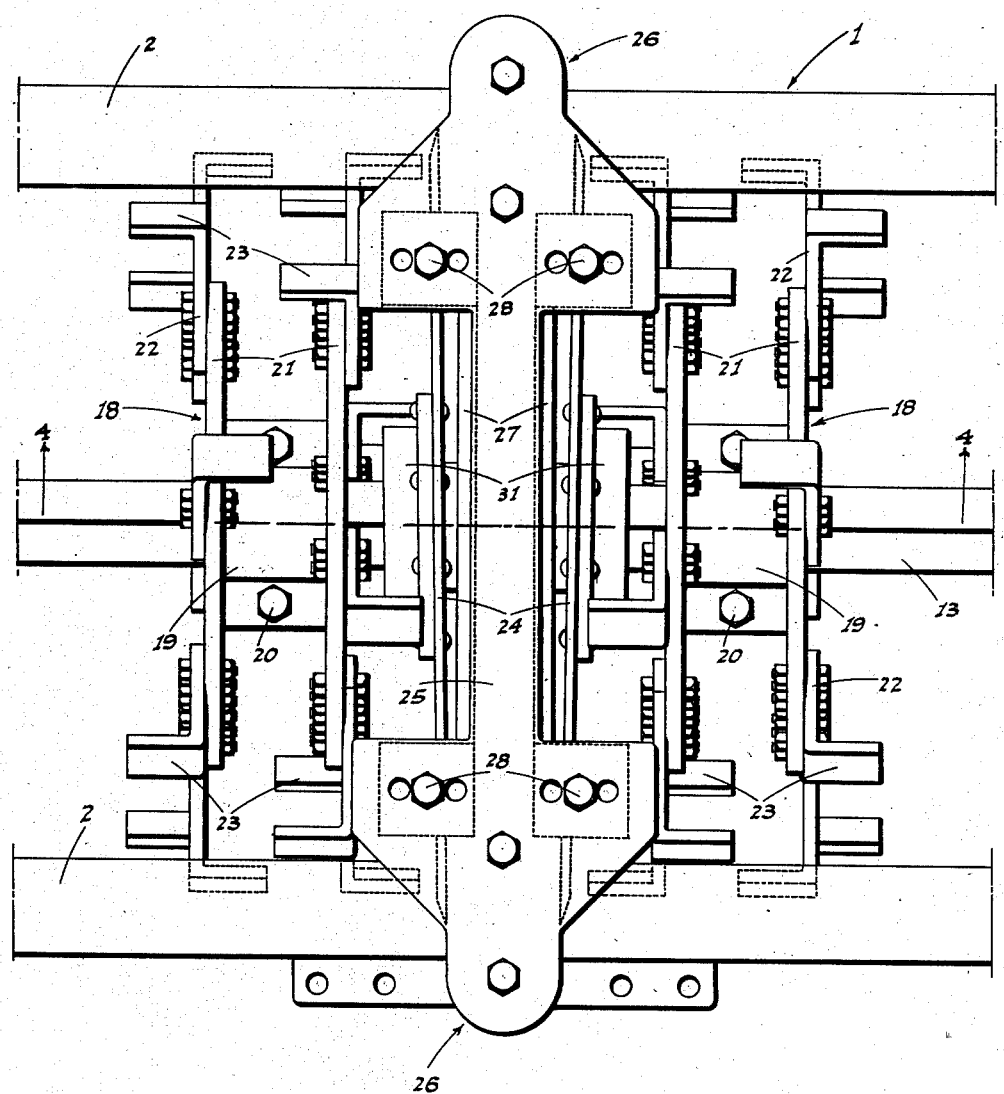

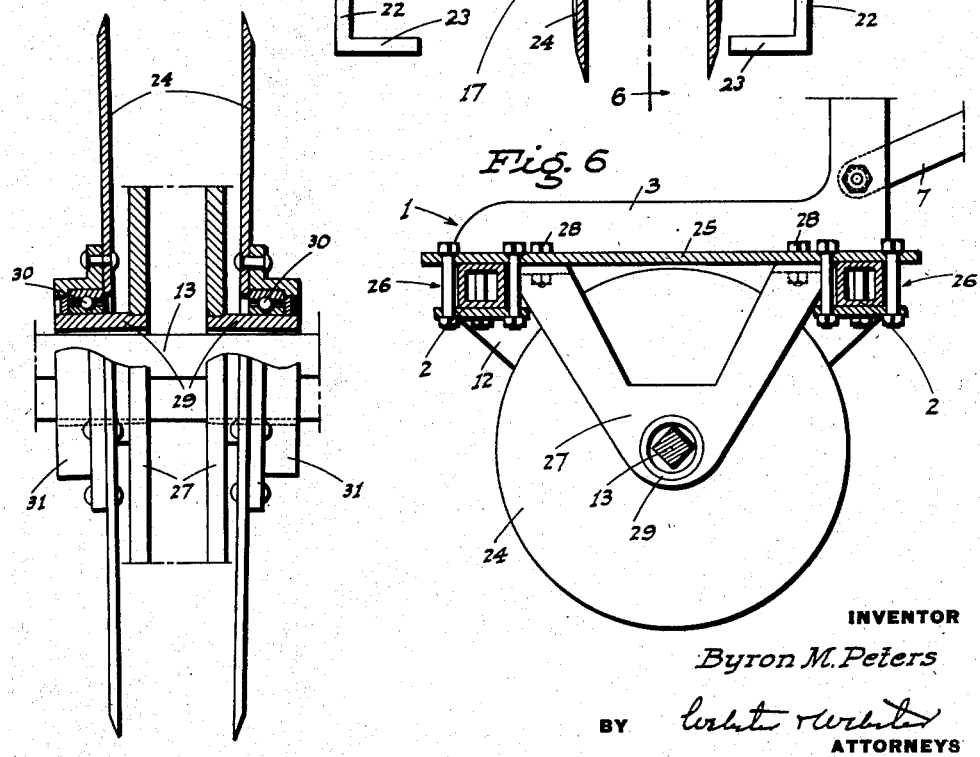

2,678,595

UNITED STATES PATENT OFFICE 2,678,595

CULTIVATOR

Byron M. Peters, Lathrop, Calif.

Application February 2, 1951, Serial No. 209,055

3 Claims. (Cl. 97—40)

The present invention is directed to, and it is a major object to provide, a novel rotary cultivator unit, adapted—when tractor mounted—to dig, weed, and mulch along opposite sides of a crop row without injury to the plants thereof.

Another important object of this invention is to provide a rotary cultivator unit, for row crops, which includes a pair of driven, transversely spaced spinners which carry the earth working elements, and non-driven but free-turning discs disposed laterally inwardly of the spinners, but with sufficient spacing to permit their passage along the sides of the plants in the row. Such discs serve the purpose of protecting the plants from the spinners, and additionally the discs act to cut weeds, vines, or the like.

An additional object of the invention is to provide a novel mount for the driven spinners and the cooperating free-turning discs; the mount being arranged for ready and convenient adjustment of the spacing of the spinners and the corresponding discs.

A further object of the invention is to provide a rotary cultivator unit which can be easily mounted in connection with, and driven from the power take-off shaft of, a conventional wheel type farm tractor.

It is also an object of the invention to provide a rotary cultivator unit which is designed for ease and economy of manufacture and installation; the unit being sturdy, and when in use requiring a minimum of maintenance or repair.

Still another object of the invention is to provide a practical and reliable cultivator, and yet one which will be exceedingly effective for the purpose for which it is designed.

These objects are accomplished by means of such structure and relative arrangement of parts as will fully appear by a perusal of the following specification and claims.

In the drawings:

Fig. 1 is a front elevation of a pair of the cultivator units as mounted on a wheel type farm tractor for working along adjacent crop rows; the tractor being shown in outline.

Fig. 2 is a somewhat diagrammatic side elevation, on reduced scale, showing the cultivator units mounted as in Fig. 1.

Fig. 3 is an enlarged fragmentary top plan view of one of the cultivator units.

Fig. 4 is a transverse sectional elevation on line 4—4 of Fig. 3.

Fig. 5 is a fragmentary plan view of one disc assembly detached and shown half in section.

Fig. 6 is a fragmentary sectional elevation on line 6—6 of Fig. 4; the view being on reduced scale.

Fig. 7 is a transverse sectional elevation showing a modified type of cultivator unit.

Fig. 8 is a fragmentary sectional plan view of the cultivator unit as in Fig. 7.

Fig. 9 is a fragmentary sectional elevation of a modified cultivator unit mounting.

The present application is a continuation in part of copending application, Serial No. 106,699, filed July 25, 1949, now Patent No. 2,658,437, on Cultivating Implement.

Referring now more particularly to the characters of reference on the drawings, and at present to Figs. 1-6, inclusive, the numeral 1 indicates generally a transversely extending, horizontal supporting frame which includes front and rear mounting beams 2 suitably connected together in unitary relation; the connections including attachment brackets 3 at the ends of said beams.

The supporting frame 1 is suspended transversely beneath a wheel type farm tractor 4 intermediate its front wheel 5 and its rear wheels 6.

Parallel linkage 7 is connected to each attachment bracket 3 and extends at a forward and upward incline, being attached at the upper end to the outer ends of supporting arms 8 which project laterally outwardly from opposite sides of the tractor frame 9; the arms 8 being stabilized by brace rods 10 which extend forwardly and upwardly in converging relation to connection with said tractor at the front.

As so mounted, the frame 1 is vertically adjustable beneath the tractor, and such frame is suspended from the tractor for such adjustment by suitable mechanism, here shown as a power actuated cable assembly, indicated generally at 11.

The cable assembly 11 is adapted to be power-adjusted under the control of the operator whereby to selectively set the vertical elevation or working position of the frame 1.

At opposite ends of the frame 1 the same includes depending brackets 12, and a cross shaft 13 which is square in cross section, is journaled in connection with and extends between the brackets 12 below the mounting beams 2 in a plane centrally therebetween; the shaft bearings being indicated at 14.

Centrally of its ends the shaft 13 extends through, and is driven from within, a gear box 15; said gear box being actuated by a rearwardly extending shaft 16 coupled to any suitable power source on the tractor, such as the power take-off shaft.

The implement includes a pair of cultivator units, each indicated generally at 17; such cultivator units being disposed on opposite sides of the gear box 15; the spacing of such cultivator units being the same as the spacing between adjacent crop rows.

The cultivator units 17 are mounted and actuated as follows; a description of one of said cultivator units sufficing for both, for the reason that they are of identical construction:

Each cultivator unit 17 comprises a pair of rotary spinners 18 normally affixed to, but adjustable along, the cross shaft 13 in transversely spaced relation.

The rotary spinners 18 each include a split hub 19 clamped to the cross shaft 13 by bolts 20; there being attachment discs 21 secured to opposite ends of each hub 19.

In turn, radial arms 22 are secured in circumferentially spaced relation to the attachment discs projecting some distance outwardly thereof. At their outer ends the radial arms 22 are bent laterally and sharpened to form cultivator blades 23; such blades having alternate lateral projection.

As the implement is advanced along a crop row, with the plants of the crop disposed centrally between the rotary spinners 18, the cultivator blades 23 work into the ground along the sides of the row, producing an effective cultivating action; i. e. digging, weeding, and mulching.

In order to protect such plants from the rotating spinners 18, each cultivator unit 17 includes a disc 24 disposed between each rotary spinner 18 and the plants in the crop row being cultivated; there thus being a pair of such discs in transversely spaced relation. Each pair of the discs 24 is supported in non-driven but free-turning relation, as follows:

A head plate 25 spans between and is secured to the mounting beams 2 centrally above each cultivator unit 17; the securing means including straddle clamps 26 whereby the plate 25 may be adjusted along the frame 1.

A pair of transversely spaced V-brackets 27 are secured to the head plate 25 and depend therefrom; the securing means being bolts 28 having selective positions whereby the spacing of said brackets may be adjusted.

At their lower ends the brackets 27 are fitted with laterally projecting sleeves 29 which surround the cross shaft 13 in clearance relation; such sleeves providing the support for bearings 30, and the discs 24 having hubs 31 journaled on said bearings 30. With this arrangement the discs 24 are effectively supported independently of the cross shaft 13 but in freely turnable relation; said discs having an effective diameter slightly greater than that of the rotary spinners 18. Consequently, upon advance of the implement, the discs 24 stand interposed between the rotary spinners 18 and the plants of the crop row, effectively protecting such plants from the action of the spinners 18, and dirt and debris thrown thereby. Additionally, as the implement advances, the discs 24 cut into the ground along opposite sides of the plant row, severing weeds, vines, etc. in the path of such discs.

The bearing supporting sleeves 29 are canted forwardly from their inner ends, which disposes the discs 24 in slightly diverging relation from front to rear (see particularly Fig. 5). This is an important feature, for the reason that the discs 24, when in operation, gradually relieve from the central portion of the crop row in which the plants are growing; such relief assuring that the upturning rear portions of the discs 24 do not disturb or shatter the ground about the plant roots. Also, by mounting the discs 24 with a slight rearward divergence, the discs—which are turned by reason of ground friction—more readily rotate.

With an implement including cultivator units 17 as described, adjacent row crops may be worked or cultivated along opposite sides of each thereof effectively, and yet without injury to the plants of the row; the depth of cultivation being controlled by vertical adjustment of the assembly of the frame 1 and shaft 13.

If desired, guard plates 32 may be suspended in front of the spinners 18 to prevent earth and debris being thrown forwardly therefrom; the spinners preferably turning forwardly and upwardly from the bottom. Also, if desired, similar guard plates may be used rearwardly of the spinners.

In Figs. 7 and 8 there is disclosed a modification of the cultivator unit, and here the same is constructed and mounted as follows:

The driven cross shaft is indicated at 33, and each spinner is identified generally by the numeral 34; the latter including, as before, a hub 35, attachment discs 36 at opposite ends of the hub, and radial arms 37 projecting from such discs with lateral cultivator blades 38 on the outer ends of such arms.

In this embodiment, however, the disc 39, which is disposed inwardly of each spinner 34, is mounted as follows:

A supporting sleeve 40 abuts each spinner 34 at its inner end, being secured thereby by a series of cross bolts 41. Each supporting sleeve 40 carries a bearing 42, and in turn a non-rotary collar 43 is journaled in connection with the bearing 42; there being a suitable arm 44 which radiates from the inner end of the non-rotary collar 43 and bears against one of the frame beams 45. Consequently, upon rotation of the supporting sleeve 40 with the hub 35, the stop arm 44 bearing against the frame 45 prevents the collar 43 from turning.

The corresponding disc 39 is mounted for free turning on the collar 43 by means including an annular retention flange 46.

It is essential that the collar 43 not rotate; this for the reason that the exterior or bearing surface thereof is formed with a cant relative to the axis of rotation of the sleeve 40 and cross shaft 33. The cant of the collars 43 is such that the adjacent discs 39 of each cultivator unit diverge slightly in a rearward direction (see particularly Fig. 8) in the same manner and for the same reason as described with the embodiment shown in Figs. 1–6 inclusive.

In certain adaptations it may be desirable that the frame constitute solely a single transverse beam, and in this event the arrangement is as shown in Fig. 9.

In this Figure the frame comprises a single transverse beam 47 supported, from opposite ends, by the parallel linkage in the same manner as in Fig. 1.

Bracket arms 48 are attached by clamps 49 to the beam 47 and extend in forwardly and downwardly sloping relation; such bracket arms 48 being arranged in pairs, and each carries the sleeve 50 on which the corresponding disc is journaled; the cross shaft 51 projecting in rotatable relation through such sleeve, as before.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tractor mounted, row crop cultivator which comprises a frame, a transversely driven shaft journaled in connection with the frame, a cultivating spinner secured to the shaft for rotation therewith, and a protector disc surrounding the shaft laterally of the spinner; a bearing member on which the disc is freely turnable, the shaft projecting in turnable relation through the bearing member, and means supporting the bearing member from the frame; said supporting means being a bracket attached to the frame, and said bearing member being a sleeve fixed to the bracket.

2. In a tractor mounted, row crop cultivator which comprises a frame, a driven transverse shaft journaled in connection with the frame, and a pair of transversely spaced cultivating spinners secured on the shaft; a pair of transversely spaced protector discs surrounding the shaft between the spinners, bracket means attached to the frame and extending alongside the discs, and a sleeve on which each disc is journaled, the sleeves being secured to said bracket means, and the shaft projecting in turnable relation through the sleeves.

3. In a tractor mounted, row crop cultivator which comprises a frame including a pair of horizontal, transversely extending frame beams spaced in the direction of travel and a cross plate spanning the beams, a driven transversely extending shaft mounted in connection with the frame centrally therebelow, a pair of transversely spaced cultivating spinners secured to the shaft, a pair of transversely spaced protector discs surrounding the shaft between the spinners; a bracket corresponding to each disc attached to the cross plate and depending alongside said disc, and a sleeve turnably supporting each disc fixed to the corresponding bracket in surrounding relation to the shaft.

References Cited in the file of this patent

UNITED STATES PATENTS

| Number | Name | Date |
| --- | --- | --- |
| 754,284 | Derham | Mar. 8, 1904 |
| 839,827 | Edgin | Jan. 1, 1907 |
| 1,322,133 | Parham | Nov. 18, 1919 |
| 2,279,652 | Beard | Apr. 14, 1942 |
| 2,438,189 | Seaman | Mar. 23, 1948 |

FOREIGN PATENTS

| Number | Country | Date |
| --- | --- | --- |
| 331,642 | Great Britain | July 10, 1930 |